June 9, 1959 E. P. TAUBES 2,889,762
PHOTOGRAPHIC DEVELOPING APPARATUS
Filed Feb. 4, 1954 6 Sheets-Sheet 1

INVENTOR.
ERNEST P. TAUBES
BY
HIS ATTORNEY

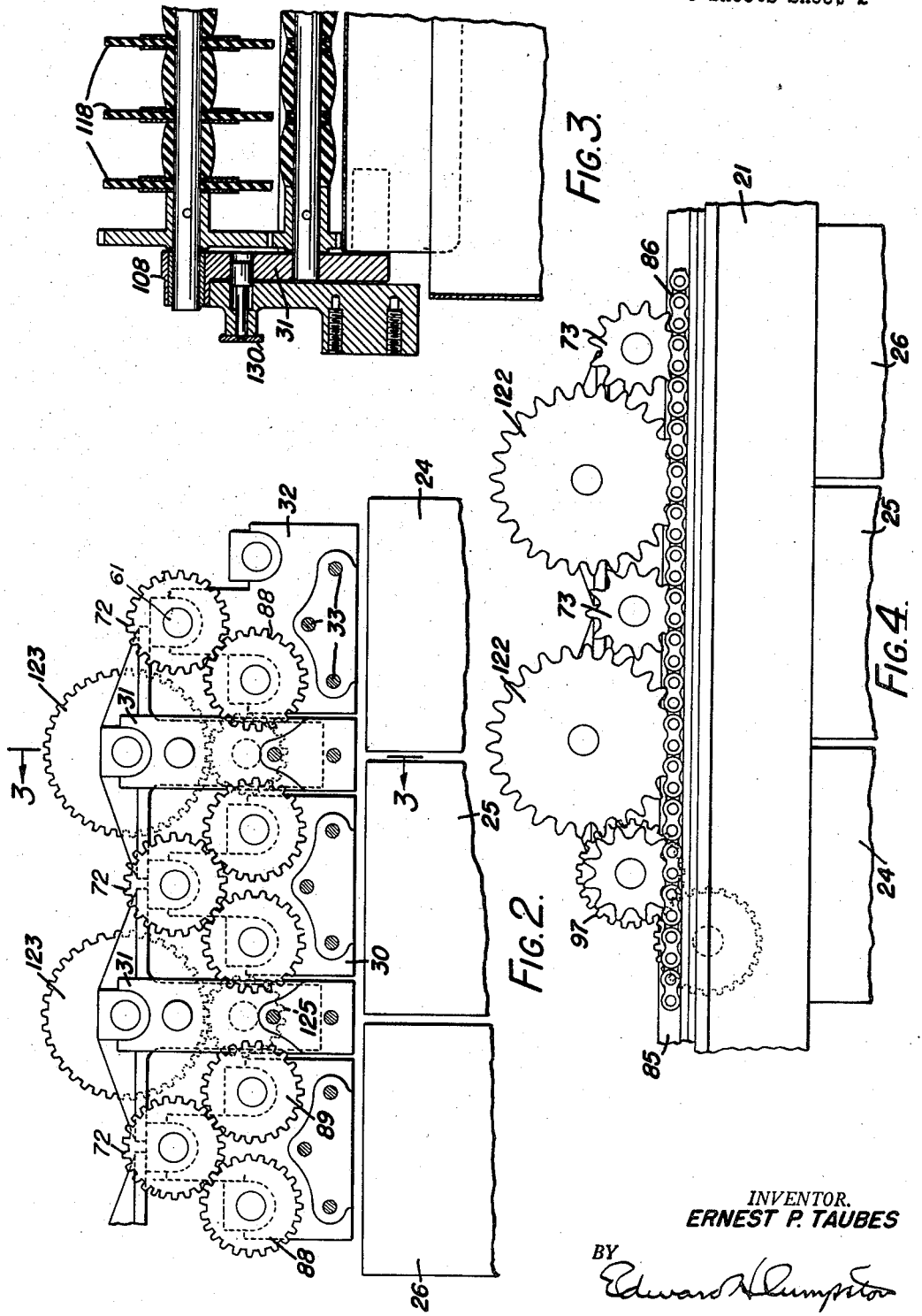

June 9, 1959
E. P. TAUBES
2,889,762
PHOTOGRAPHIC DEVELOPING APPARATUS
Filed Feb. 4, 1954
6 Sheets-Sheet 4
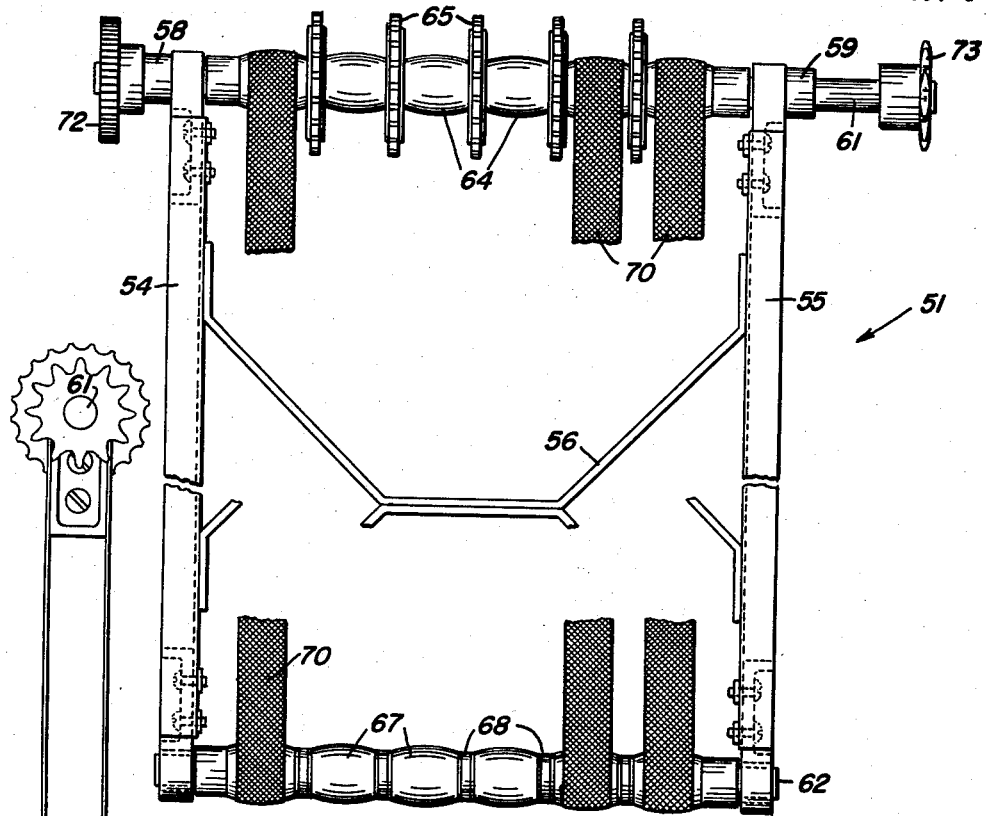
FIG. 6.
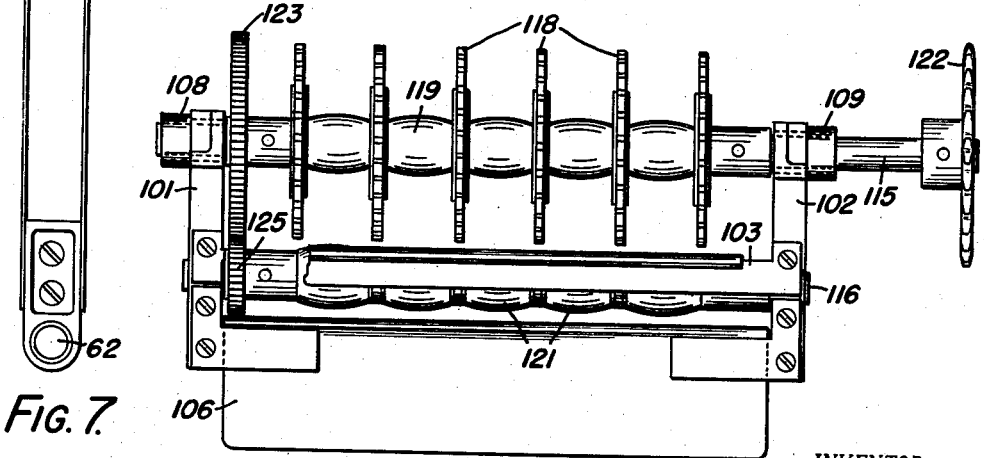
FIG. 7.
FIG. 8.
INVENTOR.
ERNEST P. TAUBES
BY
Edward H. Cumpston
HIS ATTORNEY June 9, 1959  E. P. TAUBES  2,889,762
PHOTOGRAPHIC DEVELOPING APPARATUS
Filed Feb. 4, 1954  6 Sheets-Sheet 5

INVENTOR.
ERNEST P. TAUBES
BY
Edward H. Cumpston
HIS ATTORNEY

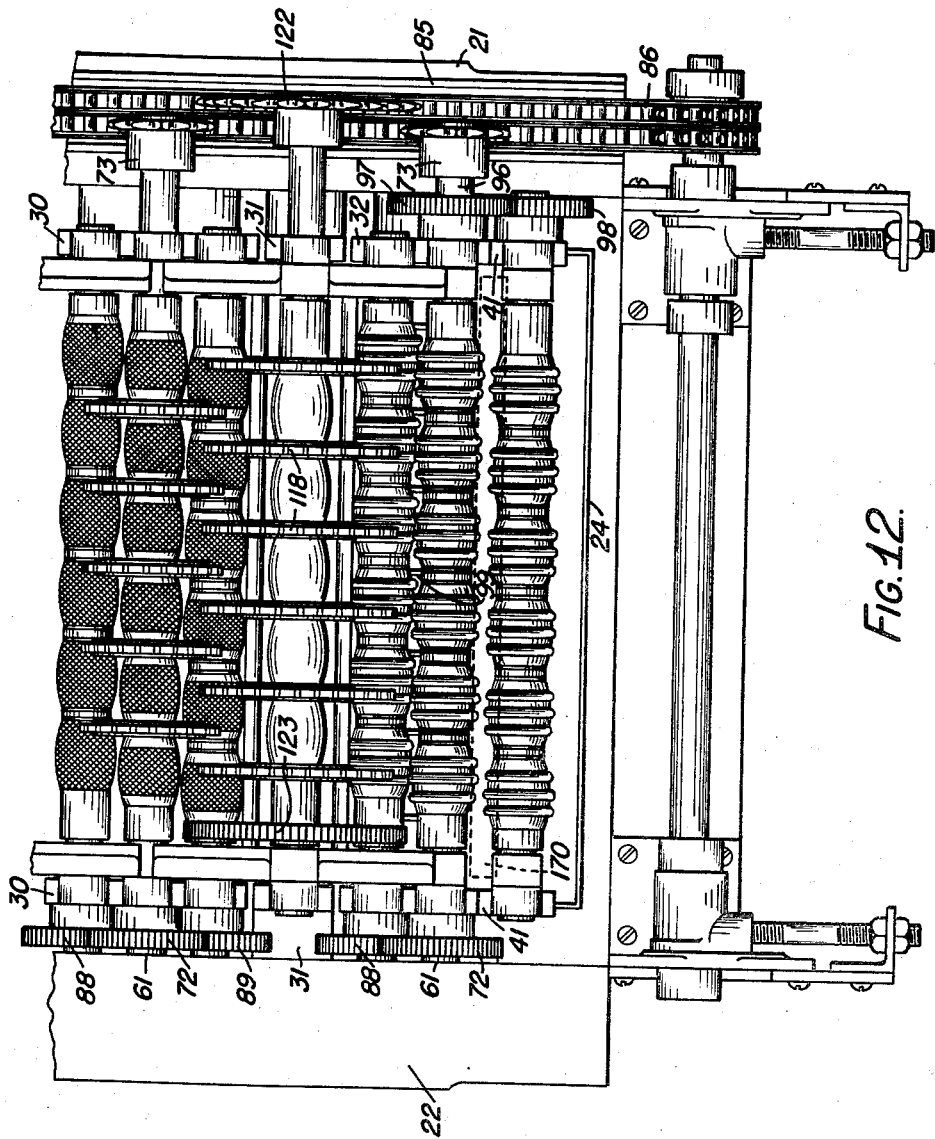

United States Patent Office 2,889,762
Patented June 9, 1959

2,889,762

PHOTOGRAPHIC DEVELOPING APPARATUS

Ernest P. Taubes, New York, N.Y., assignor to Photostat Corporation, Providence, R.I., a corporation of Rhode Island Application February 4, 1954, Serial No. 408,119

16 Claims. (Cl. 95—94)

This invention relates to apparatus for processing exposed photographic sheets, and, more particularly to devices for automatically immersing sheets of photographic materials in one or more treating solutions, one object of the invention being an improved machine of this description.

In the automatic processing of photographic sheet material, it is often desirable to receive sheets as they are ejected by a camera and automatically process same without intervention by the operator. Another object, therefore, is to provide a machine of high efficiency and reliability capable of receiving sheets of relatively thin and fragile material and processing them automatically in a reliable and rapid manner without injury to the sheets or their delicate coating emulsions.

In certain applications, such as the use of automatic copying cameras a sheet of photographic material is automatically exposed by said camera and rapidly ejected. It is desirable that the processing machine be adapted to receive this rapidly moving sheet, and immerse the same quickly, so that all parts of the sheet are uniformly developed. It is, therefore, a further object of this invention to design a machine capable of rapidly receiving and immersing sheets of photographic material.

In the practical use of automatic machines in the field, a certain amount of maintainance is always necessary in spite of the greatest care in design, selection of materials, and construction. For example, it is frequently necessary to clean the tanks and to replace such parts as flexible belts, and the like. It is, therefore, desirable that the parts of machines of this description be easily and readily accessible and demountable for the purposes of cleaning, inspection, and repair. Accordingly, it is a further object of this invention to design a machine wherein all the parts are separably removable from the main assembly with a minimum of difficulty.

Further objects is the provision of a simple, reliable, relatively inexpensive power transmission means, and the use of standardized and interchangeable parts, without loss of flexibility of design.

To these and other ends the invention resides in certain improvements and combinations of parts, all as will be hereinafter more fully described, the novel features being pointed out in the claims at the end of the specification.

In the drawings:

Fig. 2 is an enlarged fragmentary side elevation of the upper portion of the same;

Fig. 3 is a sectional front elevation taken substantially along line 3—3 in Fig. 2;

Fig. 4 is an enlarged fragmentary side elevation of the upper portion of the machine viewed from the direction opposite to that in Fig. 2;

Fig. 6 is a front elevation of a frame assembly;

Fig. 7 is a side elevation of the frame assembly of Fig. 6;

Fig. 8 is a front elevation of an intertank assembly;

Fig. 12 is a fragmentary plan view of the front part of the machine.

The present invention constitutes an improvement over the processing machine invented by Emery Dutch, and disclosed and claimed in copending application Serial No. 405,158, filed on January 20, 1954, now Patent No. 2,826,979, dated March 18, 1958. The invention is embodied in the present instance, by way of illustration, in a machine comprising a series of tanks or containers for photographic processing solutions, each containing a mechanism for conveying photographic material therethrough, and exposing same to the solution contained therein for a predetermined length of time.

The present machine comprises, preferably, a series of open top containers or tanks which may be separately or integrally constructed and a unitary supporting frame means extending over the tops of the containers and providing the support for the other portions of the machine, holding them in securely and precisely spaced relation with each other. The conveyor units, which extend downwardly into the tanks, receive the sheets of exposed photographic material and submerge them in the processing solutions for predetermined periods of time. Intertank conveyor units are mounted on the frame means in a position generally above and between adjacent tanks to receive the photographic material from one tank conveyor unit and deliver it to the next tank conveyor unit for further processing. A squeegee unit may be mounted on the frame unit beyond the last tank unit, if desired, to receive the sheet from this unit, removes the excess liquid therefrom and delivers it in a semi-dried condition, after which it may be treated by any of the standard and known types of dryers in general use in this field.

Figure 5:
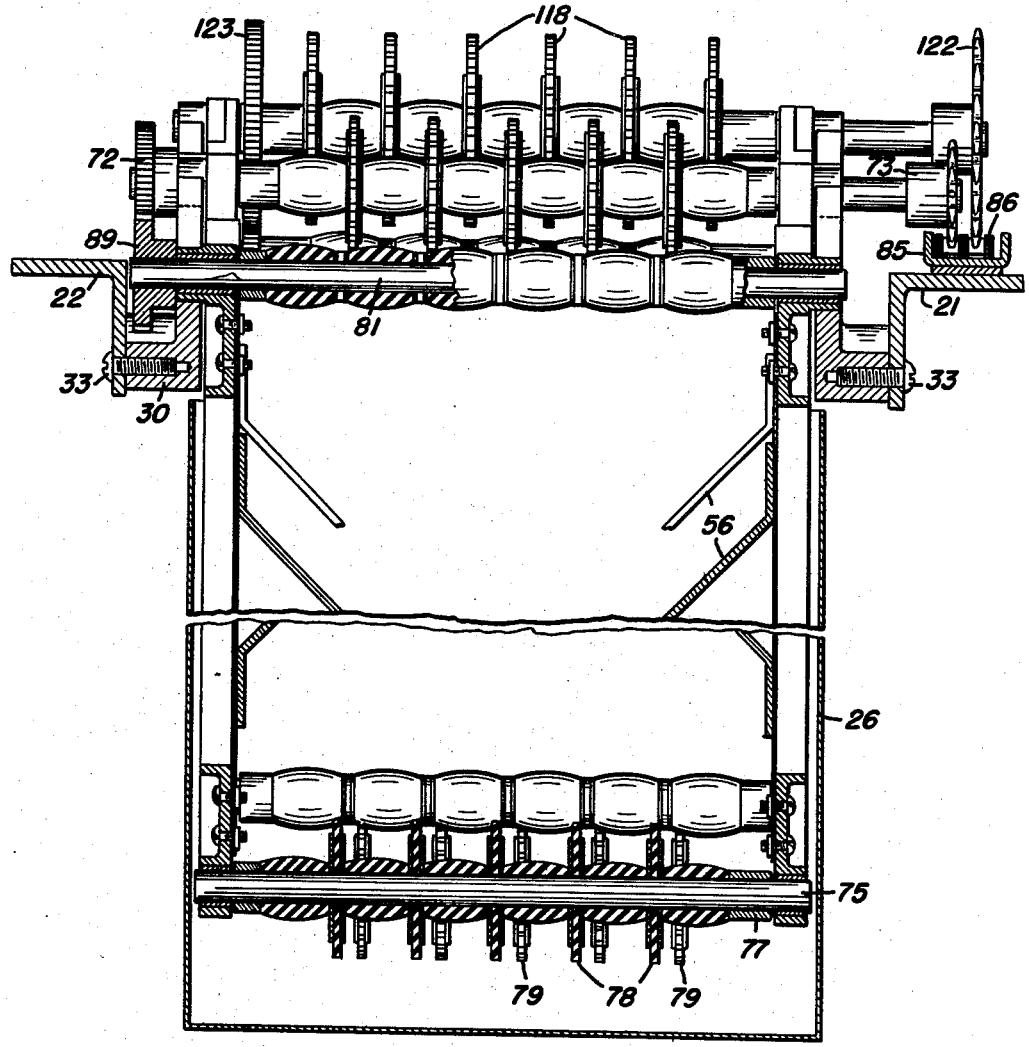
Fig. 5 is a sectional end elevation taken substantially along the line 5—5 in Fig. 1.
Figure 11:
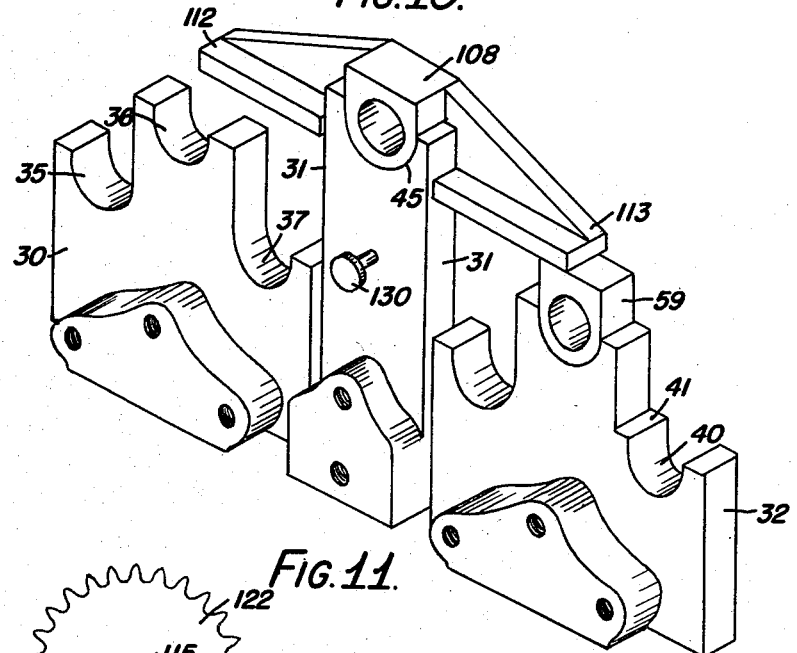
Fig. 11 is an enlarged schematic perspective of a set of bearing brackets and bearing parts or trunnions for supporting the conveyor belt frames and shown detached from the main supporting frame.

Referring particularly to Figs. 4 and 5 of the drawings, the frame means preferably comprises a pair of parallel horizontally extending, angle shaped beams 21 and 22, supported above the tanks 24, 25, and 26. It is to be understood that while three tanks are shown in this illustration, any desired number may be used, depending on the number of processing solutions used. A series of bearing brackets 30, 31, and 32, shown in detail in Fig. 11, are fastened to angle members 21 and 22 by means of screws 33. Bearing brackets 31 have three semicircular, open top bearing surfaces or saddles 35, 36, and 37 at the upper ends thereof, the center saddle 36 being higher than the other two. One of the brackets 30 and 32 is mounted on angle members 21 and 22 in coincidence with each of tanks 25 and 26. Bearing bracket 32 for the front tank is identical to bracket 30 except that the forward lower saddle 40 is laterally offset towards the front of the machine, this displacement being the width of step 41 (Fig. 11). A pair of these modified bearing brackets 32 are mounted on angle members 21 and 22 on opposite sides of the first tank 24, for reasons that will be hereinafter explained. Bearing brackets 31 are generally rectangular in outline, and each carries a single semicircular saddle 45 in its upper portion. A pair of these brackets are mounted opposite each other on the angle members 21 and 22 intermediate the adjacent tanks as shown.

Figure 1:
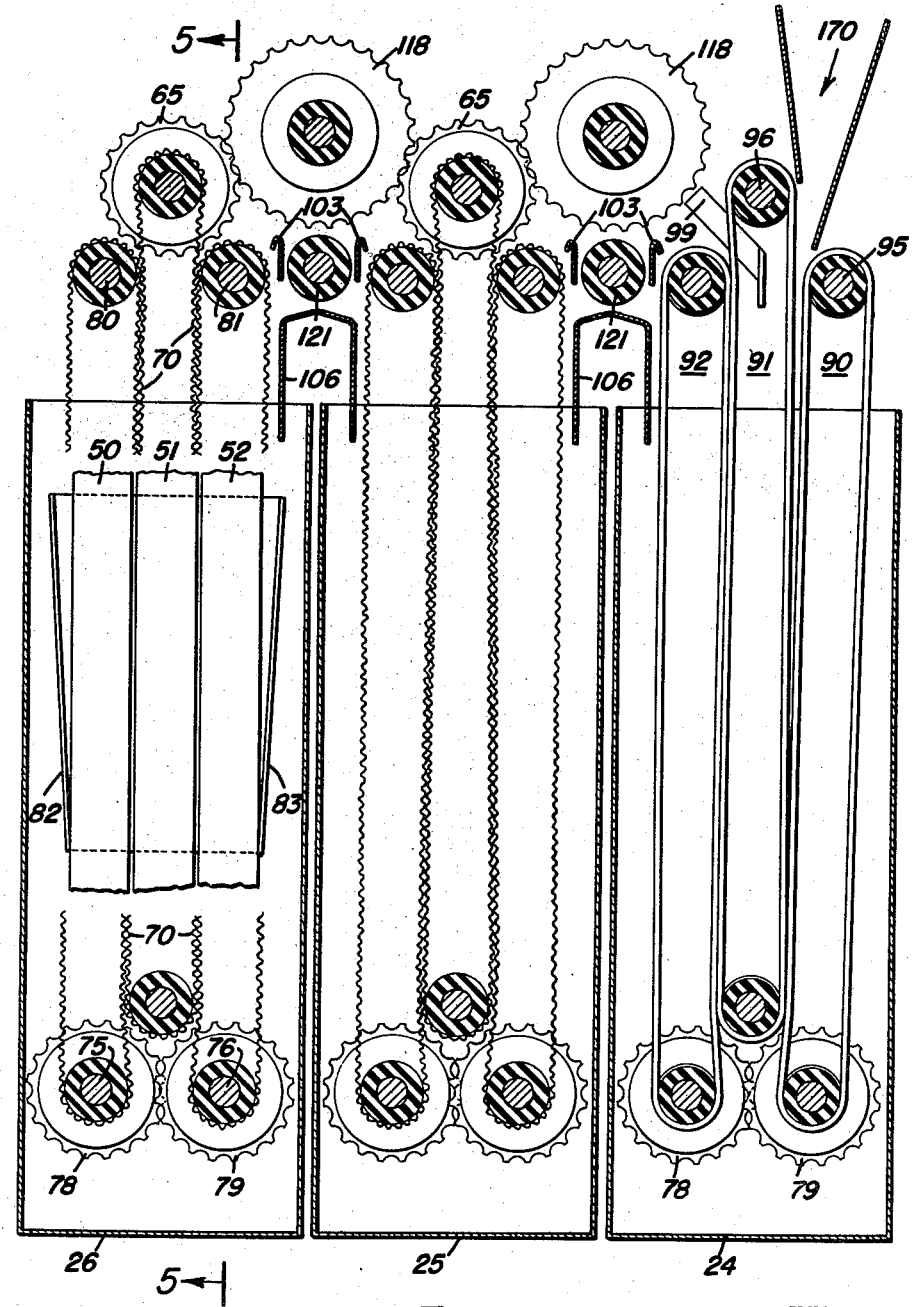
Fig. 1 is a sectional side elevation of photographic print treating machine embodying the present invention.

The tank conveyor mechanisms are supported in the bearings or saddles and extend downwardly into the tanks. The conveyor mechanism in each tank comprises three belt frames, 50, 51, and 52, as shown in Fig. 1. The intermediate frame 51, shown in detail in Figs. 6 and 7 as an example, comprises two parallel side rail members 54 and 55 connected and stiffened by cross braces 56. The upper ends of members 54 and 55 are provided with outwardly extending parts or trunnions 58 and 59, with flat top surfaces and rounded bottom surfaces adapted to fit one of the semicircular saddles described above. One of these lugs is schematically shown detached from its frame and in place in the saddle of bracket 32 in Fig. 11. The upper and lower ends of members 54 and 55 are bored to form bearings to accommodate transversely extending shafts 61 and 62. Upper shaft 61 carries a series of conical pulley surfaces 64 alternating with a series of circumferentially serrated sheet turning disks 65. Lower shaft 62 carries a similar series of pulley surfaces 67 which are, however, spaced by a series of washers 68. A series of endless belts 70 run over corresponding pulley surfaces on upper and lower shafts 61 and 62 respectively, as shown in Figure 6. The outer end of each upper shaft 61 is fitted with a gear member 72 on one end and a sprocket wheel 73 on the other, for driving purposes as hereafter described.

The other belt frames, 50 and 52 are identical with the frame 51, differing only in the arrangement of the disks and pulley surfaces on the transversely extending shafts and in the absence of a sprocket thereon. Frames 50 and 52 have the serrated disks on the bottom shafts 75 and 76 instead of on top shafts 80 and 81 thereof, as shown in Fig. 1. In addition, the lower shaft 75 of frame 50 has a wide spacer 77 (Fig. 5) on one end thereof to offset serrated disks 78 so that they will not be in line with the corresponding disks 79 on the lower shaft 76 of frame 52, which they overlap, as shown in Fig. 1.

The belt frames are supported in the upwardly opening bearing surfaces or saddles of bearing brackets 30 and 32, the lower surfaces of the parts or trunnions 58 and 59 fitting into the above mentioned sadles, the side rails extending downwardly into the tanks and slidably engaging the resilient, inwardly extending flanges 82 and 83 of an upwardly and outwardly tapering sheet metal guide or spacer fastened to the inside of the tanks, which holds the frames in relation to each other with adjacent portions of adjacent belts in contact and holds the frame ends in position relative to the tank, as best shown in Fig. 1. When in this position, upper shafts 61 are precisely horizontal and transverse to frame members 21 and 22, and the outwardly extending portions thereof are vertically above angle member 21.

The driving means comprises preferably an elongated channel shaped member 85 mounted on the upper surface of frame member 21 extending parallel thereto. Member 85 functions as a guide means for a double sprocket chain 86 which slides therealong. Chain 86 may be driven by any known and suitable means, such as for example an electric motor (not shown). Sprocket 73 which is mounted on the outwardly extending portion of shaft 61, as explained above, engages the inner portion of double sprocket chain 86. Chain 86 slides along channel 85, engaging sprocket 73, thereby driving upper shaft 61. This in turn drives belts 70, which, in turn, drive lower shaft 62. At the same time, gear 72 which is mounted on the other end of upper shaft 61, drives mating gears 88 and 89 (Figs. 1 and 2) mounted on upper shafts 80 and 81 of frames 50 and 52. All these gears have the same number of teeth, so all the upper shafts rotate at a uniform speed.

The print conveyor mechanism in the first tank 24 differs from the mechanism described above, which is used in all succeeding tanks, in that there are no serrated disks on the top shaft 96 of the center frame unit 91, as these would interfere with the feeding in of the paper. A series of inclined fingers 99 are fastened to the top of the belt frame 91 of this tank, as shown in Fig. 1, to guide the paper in a manner that will be hereinafter more fully described. A further difference resides in the lateral offset of the lower saddle 40 of bearing block 32, which has been referred to above, causing the top of frame unit 90 to be inclined away from the other frame units in this tank. This increases the distance of top shaft 95 on this frame from top shaft 96 on the center frame 91 in this tank, which necessitates a modification of the gearing connecting these two shafts. This modified gearing comprises a second gear 97 mounted on the other end of shaft 96, meshing with a mating gear 98 on shaft 95, as shown in Fig. 12.

The intertank transfer means or units are mounted in the saddle in the top of bearing brackets 31, which are located intermediate the tanks, above the walls therebetween, as explained above. These transfer units, shown in detail in Figs. 8 and 9, preferably comprise a frame consisting of two vertical members 101 and 102 connected by transverse sheet metal members 103, and an inverted U-shaped sheet metal cover or drip apron 106 (Fig. 1), covering the walls between tanks for returning any drainage to the tanks.

Figure 9:
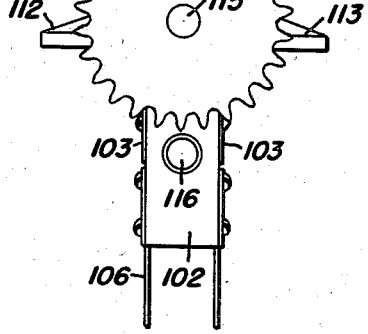
Fig. 9 is a side elevation of the assembly of Fig. 8.

The upper ends of vertical members 101 and 102 are attached to outwardly extending parts or trunnions 108 and 109, each having a flat top surface and a rounded trunnion bottom surface adapted to fit the semicircular saddle bearing in bracket 31. Parts 108 and 109 carry a pair of integral, laterally extending, tapered arms 112 and 113, as shown in Figs. 9 and 11. The upper and lower ends of members 101 and 102 are bored to form bearings to receive transverse upper and lower shafts 115 and 116. Upper shaft 115 carries a plurality of serrated disks 118 longitudinally mounted therealong, separated by spacers 119. Lower shaft 116 carries a series of roller surfaces 121. A sprocket 122 is mounted on one end of upper shaft 115, and a gear 123 is mounted near the other end thereof, meshing with a mating gear 125 on lower shaft 116. Sprocket wheel 122 engages chain 86, as shown in Fig. 5, for the purpose of driving the transfer unit.

The outer belt frames 50 and 52 are mounted in saddle bearings 35 and 37 respectively, as explained above. With the intermediate frame 51 mounted in saddle 36, gear 72 on upper shaft 61 engages gears 88 and 89 on upper shafts 80 and 81 on the outer frames 50 and 52, as shown in Fig. 2, thereby holding the outer frames in place by preventing them from moving upwardly out of saddles 35 and 37. The intermediate belt frames 51 are in turn held in place by the projecting arms 112 and 113 of member 109 on the intertank transfer units, which engage the tops of their trunnion parts 59, as shown by Figs. 2 and 11. Members 108 and 109 are held in detachable place by a removable tapered pin 130 engaging a hole in bearing block 31.

A squeegee roller and conveyor assembly is preferably mounted at the end of the machine for removing liquid from the paper as it leaves the last compartment. This assembly comprises a pair of parallel rollers 140 and 141, preferably of rubber or other elastic material resiliently pressed against each other. A series of sharp edged guide plates 143, 144 and 145 are resiliently mounted on posts 147, 148, and 149, by springs 151, 152, and 153 respectively, for guiding the paper, as will be hereinafter more fully described. These rollers are mounted on shafts in bearings similar to those described above, the upper shaft carrying a sprocket wheel on one end (not shown) in engagement with chain 86. The other end of the shaft carries a gear which meshes with a mating gear on the lower squeegee shaft 141, which in turn meshes with a third gear on an idle shaft 155. This latter gear meshes with a fourth gear on a shaft 156, bearing a series of pulley surfaces 157. A series of endless belts 160 run over these pulley surfaces, connecting them in corresponding surfaces on a second shaft 161 mounted on the end of an outwardly extending frame 162. These belts and rollers carry the processed paper away from the machine and deliver it for further processing.

Thus, the operating units of the machine are precisely and securely mounted and held in position on channel members 21 and 22, in sliding contact with guide flanges 82 and 83 in the tanks as explained above. This type of mounting has proved to be very advantageous, as the working parts are separately and detachably constructed and mounted, and may be removed from the containers by releasing and lifting them out for convenient access to any part such as a particular belt frame or belt. Further, since the working parts are held in accurately maintained relation on the frame, it is unnecessary to require close tolerances in the manufacture or positioning of the tanks.

The method of mounting the working parts on the frame itself also is advantageous. The entire mechanism is held in position by the detachable pins 130 holding the intertank transfer units in place in their saddles. When pins 130 are withdrawn, the entire intertank transfer unit may be lifted out of the machine as a unit, disengaging sprocket wheel 122 from chain 86 below it. When this has been done, the upper or intermediate belt frame, which was held in place by the projecting arms 112 and 113 of the transfer unit, may be removed as a unit by merely sliding it upwardly, out of the tank. This disengages gear 72 from the lower mating gears 88 and 89 on the outer frames 50 and 52, and leaves the latter free for withdrawal. Thus any of the working units can be removed from the machine without disassembly and without disturbing power transmission chain 86, or the means used to drive same. The result is that my machine and the component parts thereof may be very conveniently cleaned, inspected, maintained, or replaced.

In operation, my machine is adapted to receive an exposed sheet of paper or other photographic material from a camera, or other photographic device. The paper is fed vertically into chute 170, as indicated by the arrow in Fig. 1. Since the first frame 90 in tank 24 is inclined forwardly, as explained above, the upper parts of the belts on this frame are not in contact with the corresponding belts on the adjacent frame 91, but leave a receiving space. The paper is therefore free to slide rapidly down into this gap between the belts, and is therefore rapidly immersed in the solution in tank 24. When the leading edge of the paper reaches a position near the bottom of the belts, it is gripped thereby, and conveyed towards the bottom of the tank.

It has been found that the use of wide flat belts in the developing sections of machines of this description and in developing some prints may at times cause uneven development of the sections of the print in direct contact with the belts. This may make undesirable marks on the coating emulsion, and I have found in such cases that this difficulty may be overcome by the use, in one or more of the frames or tanks, of belts of small diameter or of cross sectional shape, as round or triangular, affording substantially line contact with the prints. Since the area of contact of such belts with a flat sheet of paper is very small, unevenness in development is obviated and the objectionable marking effect eliminated.

When the leading edge of the paper contacts the moving edge of serrated disk 79, it is deflected and turned towards the rear of the tank. Here the edge comes into contact with the edge of disk 78, which turns it upwardly into a position to be gripped by the belts on frames 91 and 92, which convey it upwardly to the top of the tank. At the top of the tank the edge of the paper is deflected toward the intertank transfer unit by fingers 99, attached to the top of frame 91, as explained above. The paper then is deflected towards the top of the adjacent tank 25 by the moving serrated edge of disk 118, and passes in a horizontal direction over roller 121 until it is deflected downwardly by the edge of moving disks 65 to begin its journey through the adjacent tank. Any solutions dripping from the paper as it passes from one tank to the next are caught by drip aprons 106 and drained back into the tanks. In this manner, the paper passes smoothly and uniformly from tank to tank, for exposure to the processing solutions therein.

Figure 10:
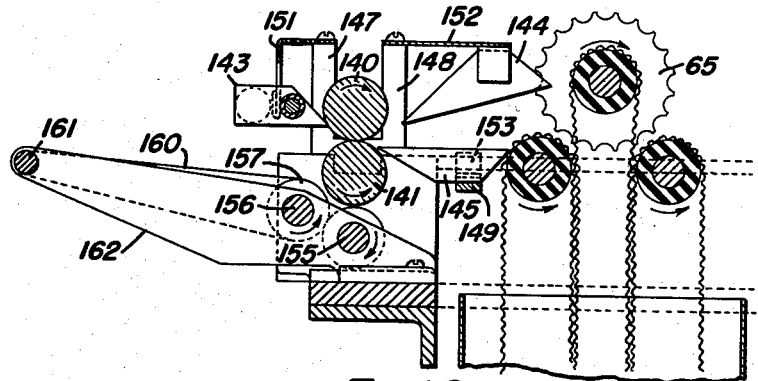
Fig. 10 is a fragmentary side elevation of the top rear portion of the machine.

As the paper is conveyed out of the last tank in the series, it is turned towards the rear of the machine by disk 65, as shown in Fig. 10. The paper moves in a horizontal direction guided by the thin edges of guide plates 144 and 145 and the leading edge of the paper is then gripped by squeegee rolls 140 and 141, which pull the paper through, removing excess solutions from the surface thereof. The sharp points of plates 143, resiliently held against squeegee roll 140 by spring 151, serve to prevent the paper from sticking to and wrapping itself around the roll by peeling it away therefrom. The partially dried print is then delivered for further drying, or any other desired treatment by conveyor belts 160.

My invention thus provides a machine in which the working parts are precisely and securely positioned and maintained in working relation and so constructed that they can be individually disassembled, for cleaning, repair or replacement, by convenient manual operations without the use of tools. The parts, furthermore, are largely of standardized and interchangeable construction involving a minimum number of different designs so as to facilitate manufacture, assembly and maintainance at minimum cost. The operating mechanism as a whole is adapted for combination with any desired number of containers of either separate or integral construction and in such a manner that the containers are economically manufactured of sheet metal with a convenient range of tolerance in dimensions.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A photographic print treating apparatus comprising an open top container for holding treating liquid, supporting frame means on said container provided with pairs of oppositely spaced upwardly opening bearings, separate conveying belt frames each having oppositely extending parts movably supported in a pair of said bearings with said frames depending into the liquid in said container, means for releasably holding said parts in said bearings for removal of said frames separately from said container, upper and lower belt rollers rotatably supported in each of said frames, belts connecting the rollers of each frame, with adjacent portions of the belts of adjacent frames moving in the same direction, first downwardly and then upwardly, to convey said prints therebetween through said liquid, said frames being movable in said bearings for adjusting the lower ends thereof relatively to said container and to one another, means located in said container for releasably pressing the lower ends of said frames together in order to bring the belts on adjacent frames into operative contact, and means for effecting coordinated rotation of said rollers and belts for conveying a print through said liquid.

2. A photographic print treating apparatus comprising an open top container for holding treating liquid, supporting frame means on said container provided with pairs of oppositely spaced upwardly opening bearings, separate conveying belt frames each having oppositely extending parts movably supported in a pair of said bearings with said frames depending into the liquid in said container, means for releasably holding said parts in said bearings for removal of said frames separately from said container, upper and lower belt rollers rotatably supported in each of said frames, belts connecting the rollers of each frame, with adjacent portions of the belts of adjacent frames moving in the same direction, first downwardly and then upwardly, to convey said prints therebetween through said liquid, said frames being movable in said bearings for adjusting the lower ends thereof relatively to said container and to one another, downwardly and inwardly inclined guide members on said container for pressing the lower ends of said frames together in adjusted position in said container, and means for effecting coordinated rotation of said rollers and belt for conveying a print through said liquid.

3. A photographic print treating apparatus comprising an open top container for holding treating liquid, supporting frame means on said container provided with pairs of oppositely spaced bearings, a plurality of parallel conveying belt frames comprising a pair of outer frames and an intermediate frame each having oppositely extending parts movably supported in a pair of said bearings with said frames extending into the liquid in said container, upper and lower belt rollers rotatably supported in each of said frames, belts connecting the rollers of each frame with adjacent portions of the belts of adjacent frames moving in the same direction, first downwardly and then upwardly to convey said prints therebetween through said liquid, the rollers of said intermediate frame being located above the corresponding rollers of said outer frames, means on the upper roller of said intermediate frame and the lower rollers of said outer frames for turning the edge of an advancing print for engagement between said belts, said frames being movable in said bearings for adjusting the lower ends thereof relatively to said container and to one another, and means for effecting coordinated rotation of said rollers and belts for conveying a print through said liquid.

4. A photographic print treating apparatus comprising a plurality of open top containers in juxtaposed relation for holding treating liquids, supporting frame means on said containers provided with pairs of oppositely spaced bearings, conveying belt frames each having oppositely extending parts movably supported in a pair of said bearings with said frames depending into the liquids in said containers, upper and lower belt rollers rotatably supported in each of said frames, belts connecting the rollers of each frame, with adjacent portions of the belts of adjacent frames moving in the same direction to convey said prints therebetween through said liquids, said frames being movable in said bearings for adjusting the same relatively to said container and to one another, means located in said container for releasably pressing the lower ends of said frames together in order to bring the belts on adjacent frames into operative contact, transfer roller means rotatably supported on said frame means above the walls between adjacent containers for turning a print delivered by the belts of one container into engagement with the belts of an adjacent container, and means for effecting coordinated rotation of said belt rollers and said transfer roller means for conveying a print through the liquids in said containers.

5. A photographic print treating apparatus comprising a plurality of juxtaposed open top containers for holding treating liquids, supporting frame means on said containers provided with pairs of oppositely spaced upwardly opening bearings, conveying belt frames each having oppositely extending trunnion parts movably supported in a pair of said bearings with said frames depending into the liquids in said containers, upper and lower belt rollers rotatably supported in each of said frames, belts connecting the rollers of each frame, with adjacent portions of the belts of adjacent frames moving in the same direction, first downwardly and then upwardly, to convey said prints therebetween through said liquids, said frames being movable in said bearings for adjusting the lower ends thereof relatively to said containers and to one another, means for releasably maintaining the lower ends of said frames in adjusted position, transfer roller means on said frame means provided with oppositely extending parts for releasably holding said trunnion parts in said bearings, said transfer roller means being detachably and rotatably mounted in a pair of said bearings for transferring a print delivered from the belts of one container into engagement with the belts of an adjacent container, and means for effecting coordinated rotation of said belt rollers and transfer roller means for conveying a print through the liquid in said containers.

6. A photographic print treating apparatus comprising a plurality of juxtaposed open top containers for holding treating liquids, supporting frame means on said containers provided with pairs of oppositely spaced upwardly opening bearings, conveying belt frames each having oppositely extending trunnion parts movably supported in a pair of said bearings with said frames depending into the liquid in said containers, upper and lower belt rollers rotatably supported in each of said frames, belts connecting the rollers of each frame, with adjacent portions of the belts of adjacent frames moving in the same direction, first downwardly and then upwardly, to convey said prints therebetween through said liquid, said frames being movable in said bearings for adjusting the lower ends thereof relatively to said containers and to one another, means located in said container for releasably pressing the lower ends of said frames together in order to bring the belts on adjacent frames into operative contact, transfer roller means on said frame means provided with oppositely extending parts detachably and rotatably mounted in a pair of said bearings for transferring a print delivered from the belts of one container into engagement with the belts of an adjacent container, means on said transfer roller means for detachably holding said felt frames in said bearings and means for effecting coordinated rotation of said belt rollers and transfer roller means for conveying a print through the liquid in said containers.

7. A photographic print treating apparatus comprising a plurality of open top containers in juxtaposed relation for holding treating liquids, supporting frame means on said containers provided with pairs of oppositely spaced bearings, conveying belt frames each having oppositely extending parts movably supported in a pair of said bearings with said frames depending into the liquid in said containers, upper and lower belt rollers rotatably supported in each of said frames, belts connecting the rollers of each frame, with adjacent portions of the belts of adjacent frames moving in the same direction to convey said prints therebetween through said liquids, said frames being movable in said bearings for adjusting the lower ends thereof relatively to said container and to one another, means located in said container for releasably pressing the lower ends of said frames together in order to bring the belts on adjacent frames into operative contact, transfer roller means rotatably supported on said frame means above the walls between adjacent containers and comprising spaced upper and lower rollers for transferring a print delivered by the belts of one container into engagement with the belts of another container, and means for effecting coordinated rotation of said belt rollers and of the rollers of said transfer means for conveying a print through the liquids in said containers.

8. A photographic print treating apparatus comprising an open top container for holding treating liquid, supporting frame means on said container provided with pairs of oppositely spaced bearings, a plurality of conveying belt frames comprising a pair of outer frames and an intermediate frame each having oppositely extending parts movably supported in a pair of said bearings with said frames depending into the liquid in said container, upper and lower belt rollers rotatably supported in each of said frames, belts connecting the rollers of each frame, with adjacent portions of the belts of adjacent frames moving in the same direction, first downwardly and then upwardly, to convey said prints therebetween through said liquid, the rollers of said intermediate frame being located above the corresponding rollers of said outer frames, the upper roller of said intermediate frame and the lower rollers of said outer frames having longitudinally spaced projecting portions thereon for turning a print into engagement between the downwardly and upwardly moving portions of said belts, said frames being movable in said bearings for adjusting the lower ends thereof relatively to said container and to one another, and means for effecting coordinated rotation of said rollers and belts for conveying a print through said liquid.

9. A photographic print treating apparatus comprising a plurality of open top containers in juxtaposed relation for holding treating liquids, supporting frame means on said containers provided with pairs of oppositely spaced bearings, conveying belt frames each having oppositely extending parts movably supported in a pair of said bearings with said frames depending into the liquid in said containers, upper and lower belt rollers rotatably supported in each of said frames, belts connecting the rollers of each frame, with adjacent portions of the belts of adjacent frames moving in the same direction to convey said prints therebetween through said liquids, said frames being movable in said bearings for adjusting the lower ends thereof relatively to said container and to one another, transfer means on said frame means above the walls between adjacent containers and comprising a roller having a plurality of disks spaced longitudinally thereon and projecting therefrom for turning a print delivered by the belts of one container into engagement with the belts of an adjacent container, and means for effecting coordinated rotation of said belt rollers and the roller of said transfer means for conveying a print through the liquids in said containers.

10. A photographic print treating apparatus comprising a plurality of juxtaposed open top containers for holding treating liquids, supporting frame means on said containers provided with pairs of oppositely spaced bearings, a plurality of conveying belt frames in each container comprising a pair of outer frames and an intermediate frame, each having oppositely extending parts movably supported in a pair of said bearings with said frames depending into the liquids in said containers, upper and lower belt rollers rotatably supported in each of said frames, belts connecting the rollers of each frame, with adjacent portions of the belts of adjacent frames moving in the same direction, first downwardly and then upwardly, to convey said prints therebetween through said liquids, said frames being movable in said bearings for adjusting the same relative to said containers and to one another, the rollers of said intermediate frame being located above the coresponding rollers of said outer frames, transfer means on said frame above the walls between adjacent containers comprising a rotary transfer roller, the upper rollers of said intermediate frames and said transfer roller having disks spaced longitudinally thereon and projecting therefrom, with the disks of the rollers of said intermediate frames and the disks of said transfer roller in overlapping relation for turning a print into engagement with said downwardly moving belt portions and the lower rollers of said outer frames being provided with disks spaced longitudinally thereon and projecting therefrom for turning a print into engagement with said upwardly moving belt portions, and means for effecting coordinated rotation of said belt rollers and said transfer roller for conveying a print through the liquids in said containers.

11. A photographic print treating apparatus comprising an open top container for holding treating liquid, supporting frame means on said container provided with pairs of oppositely spaced bearings, conveying belt frames each having oppositely extending parts movably supported in a pair of said bearings with said frames depending into the liquid in said container, upper and lower belt rollers rotatably supported in each of said frames, belts connecting the rollers of each frame, with adjacent portions of the belts of adjacent frames moving in the same direction, first downwardly and then upwardly, to convey said prints therebetween through said liquid, certain of said belts having cross-sectional shape providing substantially line contact with a print therebetween, said frames being movable in said bearings for adjusting the lower ends thereof relatively to said container and to one another, and means for effecting coordinated rotation of said rollers and belts for conveying a print through said liquid.

12. A photographic print treating apparatus comprising an open top container for holding treating liquid, supporting frame means on said container provided with pairs of oppositely spaced upwardly opening bearings, separate conveying belt frames each having oppositely extending parts movably supported in a pair of said bearings with said frames depending into the liquid in said container, means for releasably holding said parts in said bearings for removal of said frames separately from said container, upper and lower belt rollers rotatably supported in each of said frames, belts connecting the rollers of each frame, with adjacent portions of the belts of adjacent frames moving in the same direction, first downwardly and then upwardly, to convey said prints therebetween through said liquid, said frames being movable in said bearings for adjusting the lower ends thereof relatively to said container and to one another, a guideway of on said frame means, an endless sprocket chain in said guideway, means for rotating said belt rollers comprising a sprocket wheel above and detachably engaging said chain, and means for driving said chain to rotate said belt rollers.

13. A photographic print treating apparatus comprising a plurality of juxtaposed open top containers for holding treating liquids, supporting frame means on said containers provided with pairs of oppositely spaced upwardly opening bearings, a plurality of conveying belt frames in each container comprising a pair of outer frames and an intermediate frame each having oppositely extending parts detachably supported in a pair of said bearings with said frames extending into the liquids in said containers, upper and lower belt rollers rotatably supported in each of said frames, belts connecting the rollers of each frame with adjacent portions of the belts of adjacent frames moving in the same direction to convey said prints therebetween through said liquids, the rollers of said intermediate frames being located above the corresponding rollers of said outer frames, transfer roller means on said frame means provided with oppositely extending parts detachably mounted in a pair of said bearings for transferring a print delivered from the belts of one container, into engagement with the belts of an adjacent container, a guideway on said frame means, an endless sprocket chain in said guideway, means for rotating the upper belt rollers of said intermediate frames comprising a sprocket wheel thereon above and detachably engaging said chain, gearing connecting the upper rollers of said intermediate and outer belt frames, means for rotating said transfer roller means comprising a sprocket thereon above and detachably engaging said chain, and means for driving said chain to rotate said belt rollers and roller means.

14. A photographic print treating apparatus comprising an open top container for holding treating liquid, supporting frame means on said container provided with pairs of oppositely spaced bearings, conveying belt frames each having oppositely extending trunnions movably supported in a pair of said bearings with said frames depending into the liquid in said container, upper and lower belt rollers rotatably supported in each of said frames, belts connecting the rollers of each frame, with adjacent portions of the belts of adjacent frames moving in the same direction, to convey said prints therebetween through said liquid, said frames being movable in said bearings for adjusting the lower ends thereof relatively to said container and to one another, an outer one of said belt frames being inclined upwardly and outwardly away from the adjacent frame to provide a space for rapidly receiving a print to be treated, and means for effecting coordinated rotation of said rollers and belts for conveying a print through said liquid.

15. A photographic print treating apparatus comprising a plurality of open top containers in juxtaposed relation for holding treating liquids, supporting frame means on said containers, a plurality of conveying belt frames depending from said frame means in each of said containers, means for mounting said belt frames on said frame means for removal separately therefrom, upper and lower belt rollers rotatably supported in each of said belt frames, belts connecting the rollers of each frame, with adjacent portions of the belts of adjacent frames moving in the same direction to convey said prints therebetween through said liquids, transfer means removably mounted on said frame means intermediate adjacent containers and comprising a roller having a plurality of disks in spaced relation longitudinally thereof and projecting therefrom for engaging and turning a print delivered by the belts of one container into engagement with the belts of an adjacent container, and means for effecting coordinated rotation of said belt rollers and said transfer roller for conveying a print through the liquids in said containers.

16. A photographic print treating apparatus comprising a plurality of open top containers in juxtaposed relation for holding treating liquids, supporting frame means on said containers, a plurality of conveying belt frames depending from said frame means in each of said containers, means for mounting said belt frames on said frame means for removal separately therefrom, upper and lower belt rollers rotatably supported in each of said belt frames, belts connecting the rollers of each frame, with adjacent portions of the belts of adjacent frames moving in the same direction to convey said prints therebetween through said liquids, certain of said belt rollers being provided with a plurality of disks spaced longitudinally thereof and projecting therefrom for engaging and directing a print into engagement with said belts, transfer means removably mounted on said frame means intermediatee adjacent containers and comprising a roller having a plurality of disks spaced longitudinally thereon and projecting therefrom for engaging and directing a print delivered by the belts of one container into engagement with the belts of an adjacent container, and means for effecting coordinated rotation of said belt rollers and said transfer roller for conveying a print through the liquid in said containers.

References Cited in the file of this patent

UNITED STATES PATENTS

| | | |
|---|---|---|
| 1,656,522 | Josepho | Jan. 17, 1928 |
| 1,796,366 | Greene et al. | Mar. 17, 1931 |
| 1,916,108 | Hall | June 27, 1933 |
| 1,974,353 | Zollinger | Sept. 18, 1934 |
| 2,344,941 | Dutch | Mar. 28, 1944 |
| 2,347,189 | Garraway | April. 25, 1944 |
| 2,419,853 | Pask | Apr. 29, 1947 |